July 29, 1969    B. W. RAU    3,457,662
LIGHTING APPARATUS
Filed May 19, 1967    6 Sheets-Sheet 1

INVENTOR.
BEN W. RAU
BY Dominik, Stein & Knechtel
ATTYS.

July 29, 1969     B. W. RAU     3,457,662

LIGHTING APPARATUS

Filed May 19, 1967     6 Sheets-Sheet 4

INVENTOR.
BEN W. RAU
BY
ATTYS.

July 29, 1969  B. W. RAU  3,457,662
LIGHTING APPARATUS
Filed May 19, 1967  6 Sheets-Sheet 5
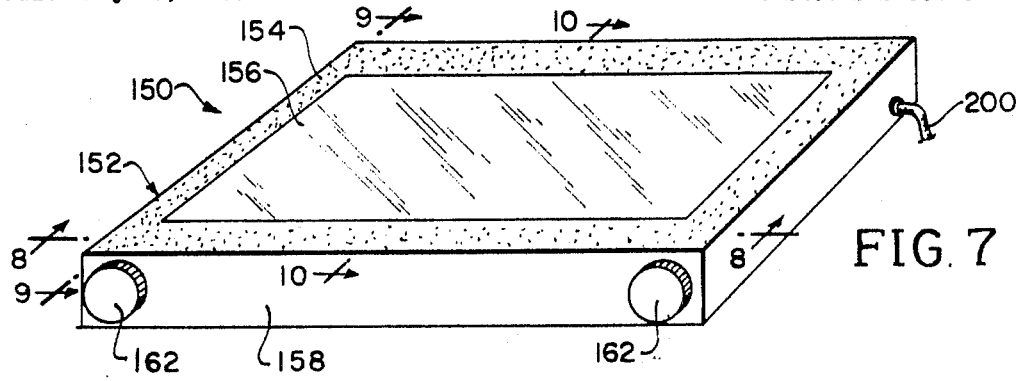
FIG. 7
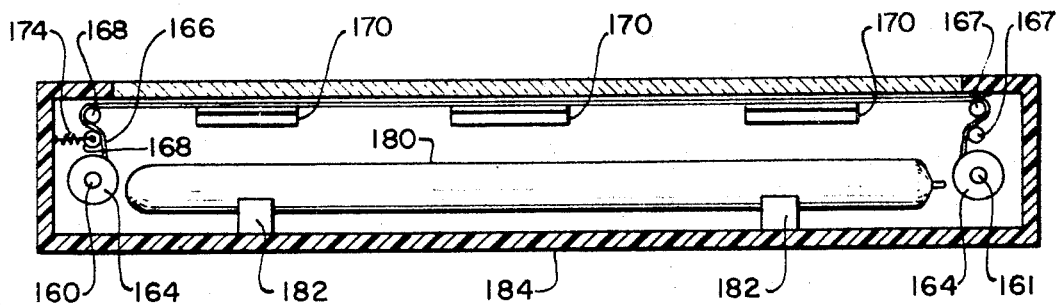
FIG. 8
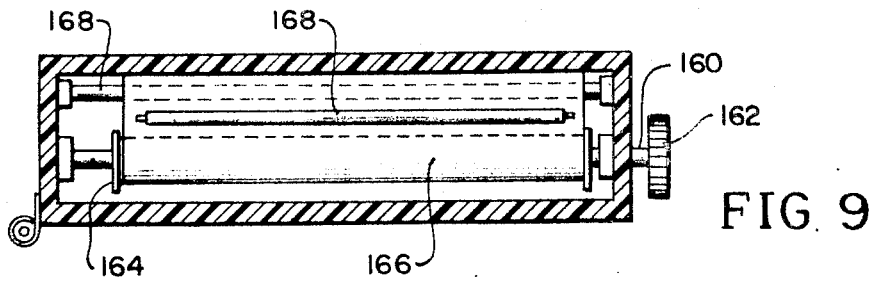
FIG. 9
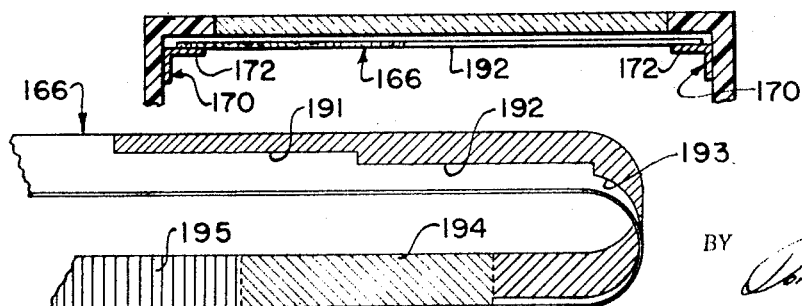
FIG. 10
FIG. 11
INVENTOR.
BEN W. RAU
BY
ATTYS.

3,457,662
LIGHTING APPARATUS
Ben W. Rau, 1535 Knollwood,
Highland Park, Ill. 60035
Filed May 19, 1967, Ser. No. 639,706
Int. Cl. G09f 11/24
U.S. Cl. 40—86    7 Claims

ABSTRACT OF THE DISCLOSURE

A portable film reader light table for viewing objects such as photographic film negatives or positives, X-ray plates or films, photo-etch negatives for etching plastic sheets, all types of slides and the like. Its source of illumination is an electro-luminescent panel or, alternatively, a cold cathode light source which is interchangeable with the electro-luminescent panel. The entire film reader light table is adapted to be collapsed into a carrying case which is an integral part of it. The design of the film reader provides a compact, lightweight, readily portable, comparatively inexpensive unit.

---

This invention relates, in general, to lighting apparatus, and in particular, to lighting apparatus for viewing or reading objects such as photographic film negatives or positives, X-ray plates, photo-etch negatives for etching plastic sheets, all types of slides and the like, hereinafter generally referred to collectively as film. More particularly, the invention relates to a portable film reader light table which can be used to view and/or read objects such as those mentioned above and which is adapted to be easily transported, by collapsing it into a carrying case which is formed as an integral part of it.

The lighting apparatus or, more appropriately, the film reader, is particularly applicable for use in reading aerial reconnaissance photographic film on reels, however, it will be apparent from the description below that it is equally applicable for use in reading any type of film or other object which generally requires illumination from behind it in order to read it.

Many film readers are presently available, however, each of them is generally unsatisfactory, for one reason or another. For example, all of them, as far as it is known, use a number of ordinary incandescent light bulbs or fluorescent tubes placed behind or at the edge of a thick translucent light diffusing screen of glass or plastic. While arrangements of this type have been used for a considerable period of time, it is generally recognized that when the light intensity is reduced to prevent eye strain, a considerable amount of headache-generating flickering occurs. As the result, an individual can only read the films for short periods of time.

Most available film readers also generate a considerable amount of heat unless a heat dissipating fan is properly attached. If the film is left on them for any substantial length of time, the heat causes distortion of the image. In extreme cases, the film is permanently distorted and therefore rendered practically useless. It is apparent that this feature is extremely undesirable.

Still another undesirable feature of the available film readers is the size and weight of them. Most of them are too large and too heavy to be readily transported. In many cases, particularly for military field use, portable, lightweight, and weatherproof carrying and storage packing are necessary features.

Accordingly, it is an object of the present invention to provide improved film readers.

Another object is to provide improved film readers which will not distort the film placed on them for reading.

Still another object is to provide improved film readers which cause little, if any, eye strain so that they can be used to read films for a relatively long period of time in comparison to those presently available.

A still further object is to provide improved film readers which are relatively small in size and weight in comparison to available film readers.

Still another object is to provide improved film readers which are readily portable.

Another object is to provide improved film readers which are easily collapsed into a compact storage case, for transporting and storing them. In this respect, it is further contemplated that the storage case form an integral part of the film reader, when assembled.

Still another object is to provide improved film readers which use interchangeably an electro-luminescent panel or cold cathode plate of 1 inch maximum thickness but with capabilities exceeding 500 foot candles for the source of illumination.

Still another object is to provide improved film readers which are easily adjustable for reading various widths of film on reels, as well as single sheets.

Other objects of the invention will in part be obvious and will in part appear hereinafter.

The above objectives are accomplished with a film reader which includes, generally, a storage case in the form of a suitcase, support legs, film holder and an interchangeable electro-luminescent panel or cold cathode light source upon which the film is placed for reading it. The entire assembly is collapsible into the storage case for transporting and storing the film reader.

The invention accordingly comprises the features of construction, combination of elements, and arrangements of parts which will be exemplified in the construction hereinafter set forth, and the scope of the invention will be indicated in the claims.

For a fuller understanding of the nature and objects of the invention, reference should be had to the following detailed description taken in connection with the accompanying drawings, in which:

FIG. 7 is a perspective view of the interchangeable cold cathode light source;

FIG. 8 is a sectional view of the cold cathode light source, taken along lines 8—8 of FIG. 7;

FIG. 9 is a sectional view of the cold cathode light source, taken along lines 9—9 of FIG. 7;

FIG. 10 is a sectional view of the cold cathode light source, taken along lines 10—10 of FIG. 7;

FIG. 11 is a perspective view of a portion of the film-like tape used to mask the light source and/or to color filter the film;

Similar reference characters refer to similar parts throughout the several views of the drawings.

Figure 1:
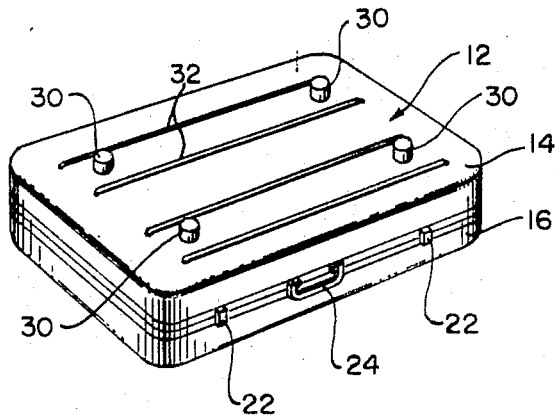
FIG. 1 is a perspective view of a film reader, illustrating the manner in which it is collapsed into the carrying case which is an integral part of it.

Referring now to the drawings, there is shown a film reader 10 (FIG. 2) which is collapsible into a carrying case 12 which is an integral part of the film reader, for transporting and storing it. The film reader 10 is light in weight, weighing under 30 pounds. The carrying case 12 into which the film reader collapses generally resembles and is of a size generally corresponding to that of a one-suiter suitcase for men. Accordingly, the film reader is easily carried by one man so that it is readily portable. As will be apparent from the description below, the film reader 10 also is easily and quickly assembled, and collapsed, so that it can be set up for use in a minimum amount of time, with little effort.

More specifically, the carrying case 12 of the film reader 10 is formed of two correspondingly shaped, complementary members 14 and 16, hereinafter referred to as upper member 14 and lower member 16, respectively, which are hingedly affixed together by means of separable hinges 18 including hinge portions affixed to the upper member 14 and to the lower member 16, respectively. When hinged together, the upper member 14 and the lower member 16 are closable to form a substantially rectangular shaped suitcase-like carrying case, as illustrated in FIG. 1. Fastening means, such as the locks 22, are affixed to the upper member 14 and the lower member 16, for closing and locking the carrying case 12. A handle 24 also is affixed to one or both of the members 14 and 16, for carrying the film reader 10 when the latter is collapsed within the carrying case 12. An operable film reader 10 has been constructed which is collapsible into a carrying case of the size generally indicated above and, when collapsed, a compact, readily portable unit is provided.

Figure 2:
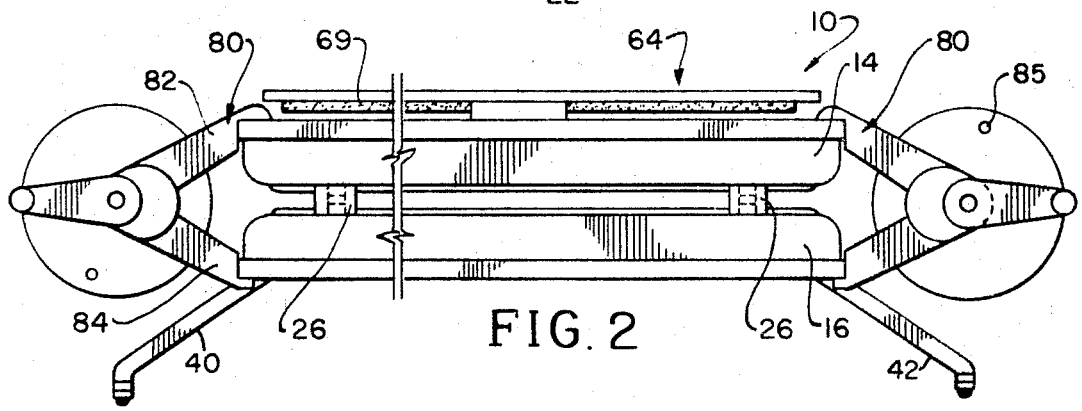
FIG. 2 is a side plan view, illustrating the manner in which the film reader is assembled.

In assembling the film reader 10, the upper member 14 and the lower member 16 are separated at the hinges, reversed in position, and the upper member 14 affixed atop the lower member 16, as illustrated in FIG. 2. A pair of spacers 26 in the form of elongated, rectangular shaped bars having rib grooves (not shown) therein and a pair of spaced stud receiving apertures 28 extending through them preferably are affixed between the upper member 14 and the lower member 16, for affixing them together. The upper member 14 and the lower member 16 each have two pairs of spaced studs 30 and longitudinally extending ribs 32 formed on them. The ribs 32 provide additional strength and, when the upper member 14 and the lower member 16 are affixed together, the ribs 32 seat within the rib grooves in the spacers 26. The studs 30 extend into the stud receiving apertures 28 in the spacers, for fixedly securing the members 14 and 16 together, as described more fully below. The spacers 26 function both to provide additional height for the film reader 10 and to fixedly align the upper member 14 atop the lower member 16.

Figure 4:
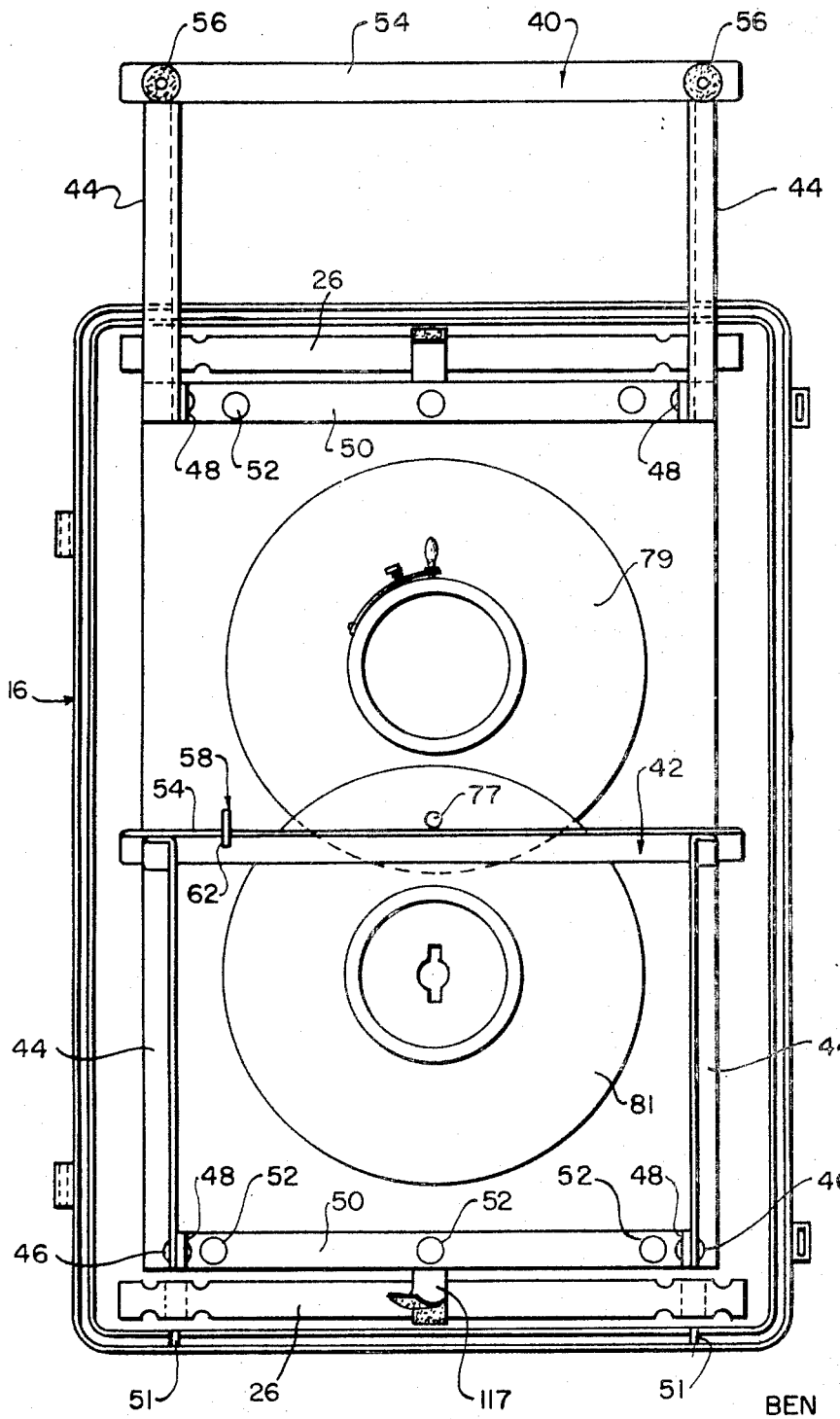
FIG. 4 is a top plan view of the lower half of the film reader, illustrating the manner in which the support legs are folded and stored within the carrying case.

The lower member 16, as can be best seen in FIG. 4, has support legs 40 and 42 pivotally affixed to it in a fashion such that the support legs 40 and 42 can be folded into and stored within the lower member 16. Each of the support legs 40 and 42 has a pair of spaced apart arms 44 which have one end thereof pivotally affixed by means of pivot pins 46 to upstanding hinge portions 48 of a plate 50 fixedly secured by means of fastening means 52 within the lower member 16. The opposite ends of each of the arms 44 are affixed to a base bar 54 having rubber, generally circular shaped feet 56 affixed to them. The feet 56 support the film reader 10 so that the base bars 54 will not scratch or mar the surface upon which the film reader is placed and will prevent the film reader from slidably moving about.

The support legs 40 and 42, when extended, as illustrated in FIG. 2, have a substantially wider span than the lower member 16 and, accordingly, provide a relatively rigid support for the film reader 10. A pair of slots 51 are formed in the peripheral edge of the lower member 16, at each of its opposite ends, into which the arms 44 of the support legs 40 and 42 seat when opened to an expanded position. The slots 51 provide additional stability, by preventing the lateral movement or swaying of the support legs. The support legs 40 and 42 also are of sufficient length to support the film reader 10 a sufficient height above any surface upon which it is set so that the operation of its film transporting mechanism, described more fully below, is not interfered with.

To collapse the support legs 40 and 42 into the carrying case 12 for transporting the film reader 10, the support legs are pivoted about the pivot pins 46, until the base bars 54 abut against the interior surface of the lower member 16. The support legs 40 and 42 are retained in the folded position, by means of the fastening means 58 affixed to the interior surface of the lower member 16, between the base bars 54. The fastening means 58 has a spring-loaded, substantially T-shaped lock member 62 which can be lifted and rotated so that its arms extend over and releasably lock respective ones of the support legs 40 and 42 under it, in the folded position.

Figure 3:
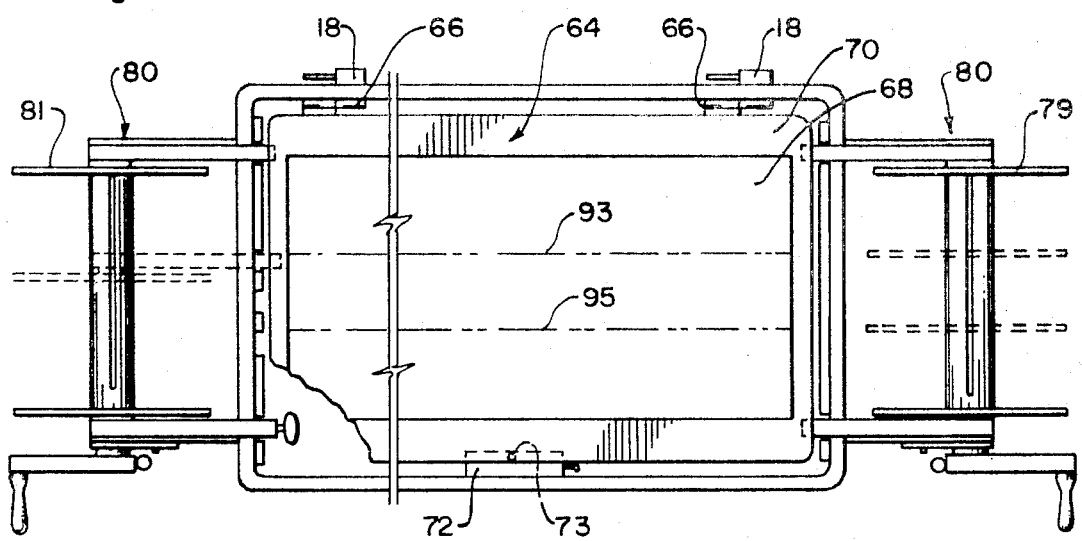
FIG. 3 is a top plan view of the assembled film reader.

Illuminating means 64 is hingedly and removably affixed by means of separable hinges 66 to the upper member 14 in a fashion such as to provide a flat viewing surface spanning across the top of the upper member 14. The illuminating means 64, as illustrated in FIGS. 2 and 3, is formed of an electro-luminescent panel 68, however, the cold cathode light source 150, illustrated in FIG. 7, is interchangeable with it, as described more fully below. The electro-luminescent panel 68 is rectangular in shape and set within a recess formed in a base support 70. A transparent protector (not shown) of glass, plastic or the like also is affixed within the recess in the base support atop the electro-luminescent panel 68 to protect the latter from being damaged, as by scratching or marring its top surface. A resilient, preferably sponge rubber, pad 69 (FIG. 2) is affixed to the underside of the support 70, for reasons set forth below. The edge of the base support 70 opposite the hinges 66 is supported upon a support member 72 affixed to the upper member 14, and the support member 72 and the base support 70 are provided with the complementary parts of a push button lock 73, for locking the base support 70 and hence the electro-luminescent panel 68 in a functionally operative position with respect to the upper member 14.

A transformer 74 (FIG. 5) is affixed within the upper member 14, beneath the base support 70, and is coupled to the electro-luminescent panel 68 for energizing it. The transformer 74, in turn, is energized by coupling it to a source of power, such as the standard 110 volt source of power generally found in most homes and offices, by means of the electrical cord 76. An on-off switch 78 may advantageously be provided for controlling the energization of the film reader 10.

The output frequency of the transformer 74 should be of sufficient value to properly illuminate the electro-luminescent panel 68, in accordance with its operational characteristics to provide the most efficient illumination, with the longest useful life. In the above-mentioned operative model, an electro-luminescent panel manufactured by the General Electric Company and a transformer having an output of 400 cycles per second are used. When energized at this frequency, the electro-luminescent panel provides sufficient illumination to read a film placed atop it. A greater and more satisfactory illumination is provided when the transformer has an output of 600 cycles per second, however, the useful life of the electro-luminescent panel is substantially shortened. Accordingly, in a particular application, the illumination and the useful life desired to be obtained with the electro-luminescent panel must be considered and the output of the transformer established accordingly.

Figure 5:
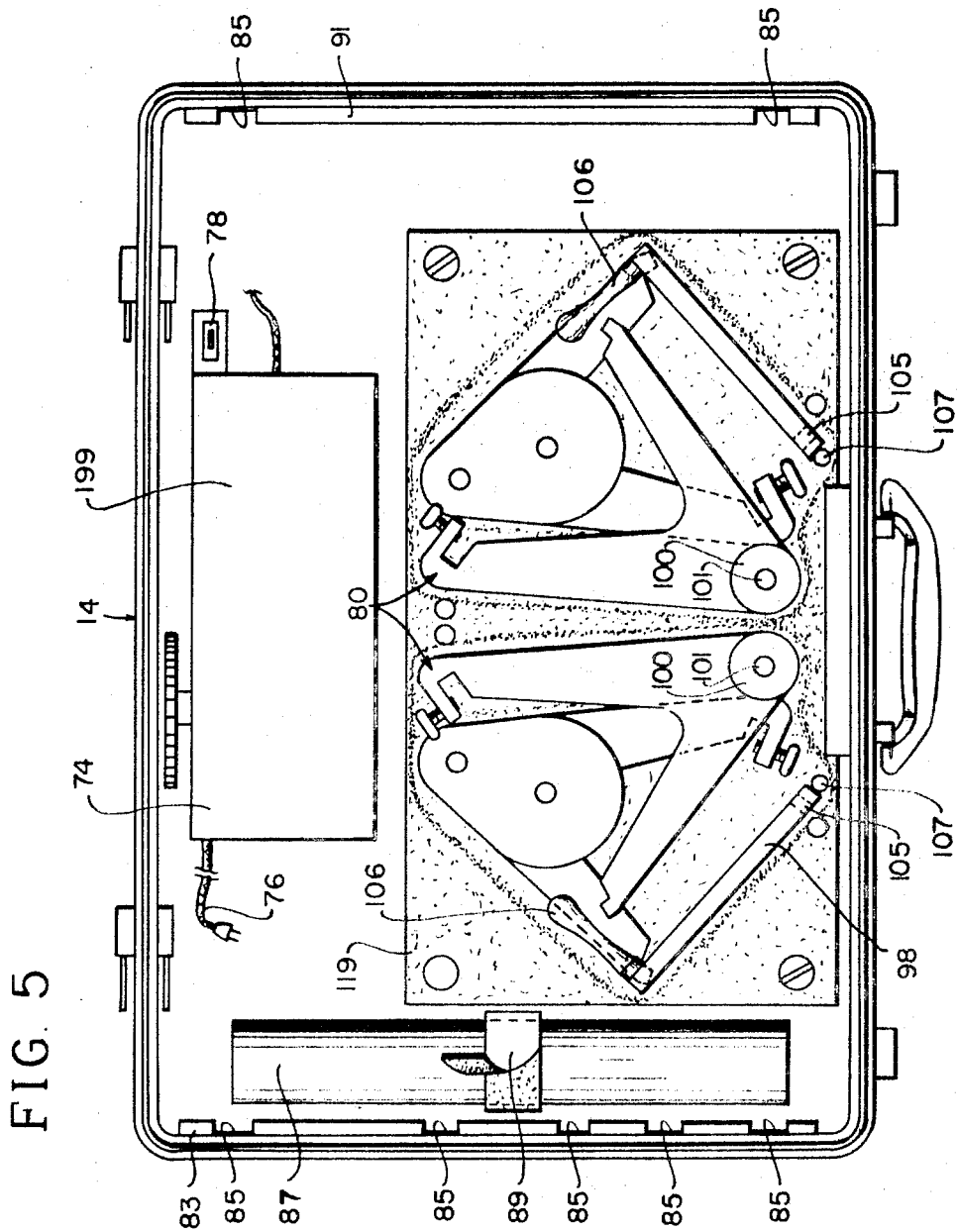
FIG. 5 is a top plan view of the upper half of the film reader, illustrating the manner in which the components of the film reader are stored within the carrying case.
Figure 6:
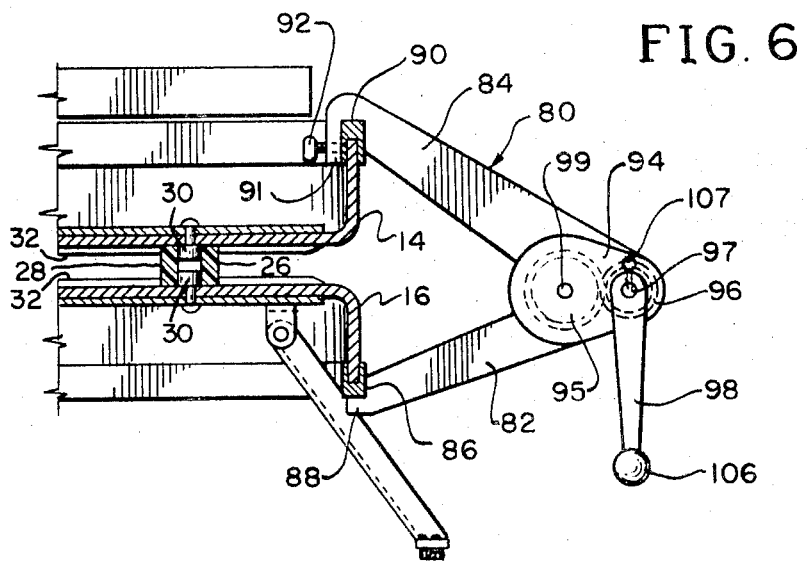
FIG. 6 is a partial sectional view of an end of the film reader, illustrating the manner in which the film reel support is affixed to it.

A pair of film reel supports 80 are removably and adjustably affixed to each of the opposite ends of the members 14 and 16, as illustrated in FIGS. 2 and 3, for supporting and transporting the film across the top of the electro-luminescent panel 68 so that the film can be read. A pair of positioning bars 91 and 83 (best seen in FIG. 5) are affixed within the upper member 14, along each of its opposite sides, respectively, and have a number of position slots 85 formed therein, in predetermined spaced relation. The bars 91 and 83 assist in positionally affixing the supports 80 to the film reader 10, as described more fully below. Each of the film reel supports 80, as can be best seen in FIG. 6, is substantially V-shaped having arms 82 and 84 which are angularly disposed with respect to one another so that the ends thereof can be adjustably and positionably fixed to the edges of the members 14 and 16. The ends of the arms 82 are notched so as to provide a surface 86 against which the edge of the lower member 16 abuts when a projection 88 is extended beneath the peripheral edge of the lower member 16, as illustrated. The end of the arm 84 has a slot 90 formed in it for receiving the peripheral edge of the end of the upper member 14 and a thumb screw 92 is adapted to be threaded into the slot 90 to engage the edge of the upper member 14 to fixedly secure the film reel supports to the upper member 14.

To affix the film reel supports 80 to the upper member 14, the upper edge thereof is fitted within the slot 90 in the arm 84, with its end 91 engaged within one of the position slots 85. The arm 82 is next positioned to engage the projection 88 thereon beneath the peripheral edge of the end of the lower member 16 and with the edge of the lower member 16 abutted against the surface 86 thereon. The thumb screw 92 is then tightened to fixedly secure them in position. It may be noted that with the above described construction, the film reel supports 80 hold the top and bottom members 14 and 16 together so that no additional fastening means are required for the studs 30. In other words, the film reel supports 80 retain the studs 30 within the apertures 28. The film reel supports 80 further can be adjustably positionably affixed to the members 14 and 16 so as to support and transport the various size film reels presently generally used. The slots 85 are spaced so that upon engaging the end 91 of the film supports in them, the film supports are automatically positioned in a proper spaced relationship to supportingly retain a film reel between them. A mask in the form of an opaque sheet of film or the like is provided to cover the unused portion of the electro-luminescent panel and is affixed to the electro-luminescent panel so as to cover pre-determined areas of it, as indicated by the dot-dash lines 93 and 95 (FIG. 3). The film reader 10 therefore is easily adapted to read any one of the various size films.

Two of the film reel supports 80 preferably have a gear box 94 affixed to them at the apex of the V which has a pair of meshed gears 95 and 96 therein. A shaft 97 is affixed to the gear 96 and is adapted to have a crank arm 98 affixed to it for rotating both the shaft 97 and the gear 96. A shaft 99 which is adapted to operatively engage and to support one end of a film reel is affixed to and rotatably driven by the gear 95. The gears 95 and 96 preferably have a ratio of 3:1 so as to provide rapid winding and re-winding operations. The other two film reel supports, as can be seen in FIG. 5, have collars 100 at the apex thereof and a shaft 101 rotatably affixed to them. One end of each of the crank arms 98 has an aperture 105 extending through it for receiving the shaft 97, and the latter is removably affixed therein by means of a spring loaded pin 107 which is adapted to lockingly engage with the shaft. The opposite end of each of the crank arms 98 has a handle 106 rotatably affixed to it for turning them. The shafts 101 are adapted to lockingly engage and rotatably support the respective ends of a film reel affixed between them. As the crank arms 98 are rotated, the film is unrolled from one of the film reels, passed across and in engagement with the top surface of the electro-luminescent panel 68 and wound on the other one of the film reels.

The film reel supported by the film reel supports on the left side (as illustrated) of the film reader generally are the film reels upon which the film is supplied and/or stored. Accordingly, these film reels can be of any one of a number of different sizes (for example, film reels for 9 and 5 inch film or 70, 35 and 16 mm. film). The illustrated position slots 85 are positionally spaced to accommodate these standard size film reels, however, it is apparent that other position slots can be provided, if desired. In FIG. 3, two different size film reels are illustrated affixed between the film reel supports. The film reel supported by the film reel supports on the opposite side of the film reader are advantageously of the collapsible type disclosed in a co-pending application of Ben W. Rau, filed May 19, 1967 Ser. No. 639,705. These film reels have, among other features, one end disk 111 which is adjustably positionable, as indicated in FIG. 3, so that the same film reel can be used for the various different size films.

All of the various components of the film reader 10 are stored, for transporting them, in either the upper member 14 or the lower member 16. The support legs 40 and 42 also are folded into and retained within the lower member 16. As can be seen in FIGS. 4 and 5, the spacers 26 are fixedly held in the lower member 16, by means of resilient fastening means, such as the flat rectangular-shaped strips of releasable self-locking tape 117. The film reel supports 80 and the crank arms 98 are placed within a formed cushion member 119 of resilient material, such as fiber glass, Styrofoam or rubber, in the upper member 14. A correspondingly shaped cushion cover (not shown) can be provided to completely enclose these components. The various components, the cushion member 119, the upper member and the lower member, 14 and 16 respectively, also are advantageously color-coded with, for example, colored dots, to assist both to properly place them in the cushion member for storage and to operatively affix them to the upper and lower members 14 and 16.

It may be further noted that the film reader 10 also is adapted to store one of the collapsible type film reels disclosed in the above-mentioned co-pending application. As can be best seen in FIG. 4, the lower member 16 has a pin 77 which is vertically disposed and positioned to extend between the ends of the folded support legs 40 and 42. Each of the ends plates 79 and 81 of the collapsible film reel have an aperture 85 (FIG. 2) which is slightly larger in diameter than the pin 77. These end plates 79 and 81 are affixed within the lower member 16 by extending the pin 77 through the apertures 85. The slight curvature of the abutting wall of the lower member 16 is sufficient to cause the pin 77 to bind in the apertures 85, so that the end plates 79 and 81 are securely held in the lower member without the need of additional fastening means. The support legs 40 and 42 fold atop the end plates 79 and 81, as illustrated. The spool 87 of the collapsible film reel to which the end plates 79 and 81 are removably affixed is stored within the upper member 14, as can be seen in FIG. 5. In this case, the spool 87 is fixedly held therein by means of a flat rectangular-shaped strip of releasable self-locking tape 89.

From the above description of the film reader 10, it can be seen that a readily portable, lightweight unit is provided which can be easily set up for use, or collapsed for transporting it.

The film to be read, if it is in reel form, that is, a continuous length of film wound on a film reel, is affixed between one pair of the film reel supports 80 affixed to one side of the film reader. It is then threaded across the face or top surface of the electro-luminescent panel 68 and re-wound on the film reel affixed between the pair of film reel supports affixed to the other side of the film reader. The film is transported, in either direction, across the electro-luminescent panel 68 for reading it, by turning the appropriate one of the crank arms 98. The film in being transported across the electro-luminescent panel 68 slidably engages the edges of the base support 70. Normally the film is not damaged as it slidably engages the edges, however, the base support 70 is preferably coated with an antifriction material (not shown) such as nylon or Teflon along the edges where it is engaged by the film to assure damage-free operation. Alternatively, a roller (not shown) can be rotatably supported at each end of the electro-luminescent panel, to protect the film. The rollers each can be, for example, ten smaller rollers 1 inch long and ⅜ inch in diameter, made of Delrin. These rollers can be rotatably affixed to a stainless steel support rod. Since the film reel supports 80 are adjustable to positionably align them on opposite sides of the film reader 10, the need for additional means for feeding and aligning the film so that it may be unwound and rewound on the pairs of film reels is eliminated.

The electro-luminescent panel 68, when energized in the above-mentioned manner does not generate heat in contrast to those film readers using incandescent light bulbs and fluorescent tubes in combination with translucent light diffusing screens. Accordingly, the film can be left on the electro-luminescent panel 68 for viewing for a substantially longer period of time, without distorting or damaging it. Also, the illumination of the electro-luminescent panel 68 does not flicker as it does with the usual fluorescent tube. The intensity remains substantially constant. Accordingly, it is found that the individuals reading the film can do so for relatively longer periods of time in comparison to existing film readers, without eye strain.

In FIGS. 7-14, there is illustrated a cold cathode light source 150 which is interchangeably used with the film reader 10, to provide the source of light for reading film. The cold cathode light source 150 includes a closed, box-like case 152 which has a length and width substantially corresponding to those of the illuminating means 68, and a thickness which is approximately 1 inch. Hinge portions (not shown) are affixed to the one side end of the case 152 so that the cold cathode light source is removably affixed to the upper member 14, in the manner described above. That is, these hinge portions are engaged with the hinge portions 18 on the upper member, and the opposite side edge seats on the support member 72.

A top wall 154 of the case 152 has a transparent window 156 of glass or plastic in it, and one of the side walls 158 has a pair of rotatably supported shafts 160 and 161 extending through it, to which are affixed a pair of knobs 162 for rotating them. A pair of reels 164 having a film-like tape 166 (described more fully below) wound thereon are affixed, for rotation, to respective ones of the shafts 160 and 161. The tape 166 is wound on one of the reels 164 threaded between pairs of spaced, rotatably supported tensioning rollers 167 and 168 at each of the opposite sides of the case 152, respectively, and wound on the other one of the reels. The upper one of each of the pair of tensioning rollers 167 and 168 are horizontally aligned in the same plane, so that the tape 166 upon being wound about them presents a flat, horizontally disposed surface beneath the window 156. L-shaped brackets 170 can be affixed to the opposite side walls of the structure 152, with one leg 172 thereof disposed and positioned so that the edges of the tape 166 slidably engage the top surfaces thereof (FIG. 10) to help maintain and support the tape in a flat, horizontal position. The lower one of the pair of tensioning rollers 168 also is advantageously biased against the tape 166, by means of, for example, spring biasing means 174, to maintain the tape taut.

Figure 12:
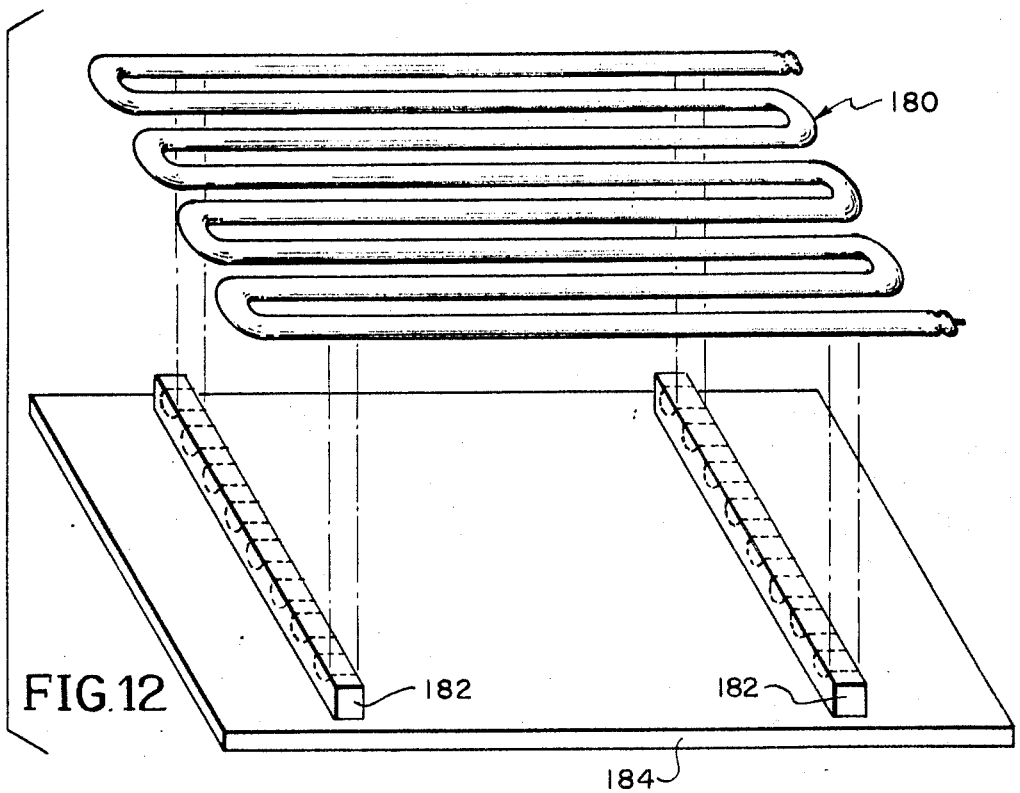
FIG. 12 is an exploded perspective view, generally illustrating the manner in which the cold cathode tube is supportedly mounted within the cold cathode light source of FIG. 7.
Figure 13:
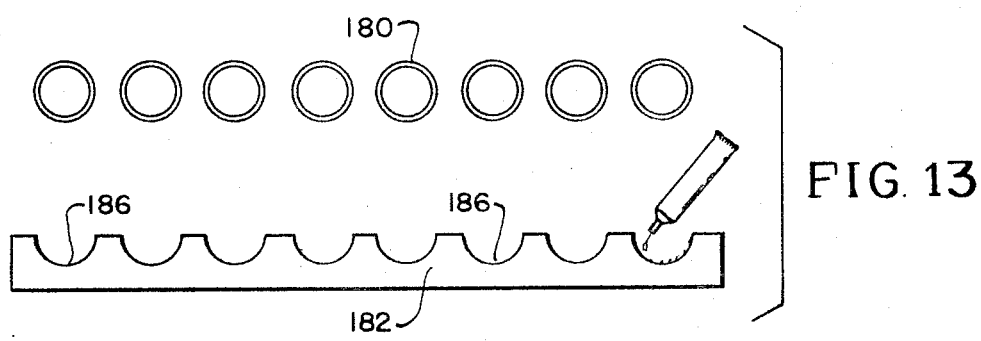
FIGS. 13 and 14 are end views, generally illustrating the steps used in affixing the cold cathode tube to the supporting blocks.
Figure 14:
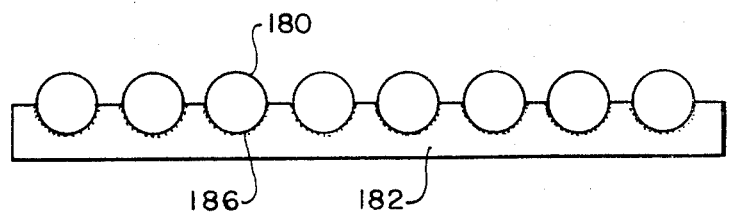

A convoluted cold cathode tube 180 is mounted within the case 152, beneath the tape 166, upon a pair of spaced support blocks 182. The support blocks 182 preferably are molded of silicone rubber and the cold cathode tube 180 is form-fitted to them, generally as illustrated in FIGS. 12-14.

The cold cathode tube 180 is generally circular in cross-section, however, there is usually some slight variation in its diameter along its length. These variations are due to the inability to precisely control the diameter during the tube forming operation. In addition, perfect parallelism between the convoluted lengths of the tube is difficult to repeat in production. It is therefore generally difficult to pre-form a pair of support blocks to resiliently and securely support the cold cathode tube to prevent it from being broken as a result of an impact to the structure 152.

This difficulty is overcome by affixing a pair of uncured silicone rubber support blocks 182 to the bottom wall 184 of the structure 152 and then pressing the cold cathode tube 180 into them to approximately one-half the thickness of the support blocks. The silicone rubber is permitted to cure at room temperature, for approximately 20 hours. After the silicone rubber has cured, the cold cathode tube 180 is removed, and upon removing it, a number of recessed grooves 186 corresponding to the number of convolutions in the cold cathode tube 180 remain molded into the silicone rubber support blocks. Each of these grooves 186 correspond almost exactly to the peripheral contour of the cold cathode tube at the positions where the support blocks intersect the tube, so that the tube is firmly supported within the grooves. Adhesive, such as glue, next is applied to the grooves 186, and the cold cathode tube replaced therein and the adhesive allowed to cure. It is found that when the support blocks are formed and the cold cathode tube is affixed to the silicone rubber support blocks in the described manner, the cold cathode tube is securely and resiliently supported, and is less subject to breakage, even when dropped or otherwise subjected to severe impacts.

A further advantage in affixing the cold cathode tube 180 within the support blocks 182 in the described manner is that the "blind" spots created with conventional fastening by wires or clamps overlying the tube in the direction of illumination are eliminated. The method of the present invention secures entirely to the "blind side" of the tube 180.

In FIG. 11, a looped portion of the film-like tape 166 is illustrated. The tape preferably is of a Mylar film 0.005 inch in thickness, having a number of masks and color filters such as the illustrated masks 191–193 and the color filters 194 and 195 (FIG. 11) integrally affixed or formed with it. The reels 164 will accommodate approximately 30 feet of such a film. The masks 191–193 function in the same manner as the masks described above, to block off portions of the window 156 to adapt the same to the particular size film being read and/or to mask or block out all but a predetermined area such as a circle so as to permit viewing or reading of only that portion of the film. The latter feature is particularly useful when using a multipower stereoscope film reader such as the one disclosed in co-pending U.S. application, Ser. No. 702,067, filed Jan. 31, 1968, now U.S. Patent 3,418,-035 issued Dec. 24, 1968, by Ben W. Rau.

The color filters 194 and 195 are used with, for example, colored aerial reconnaissance photographic film negatives, to filter out corresponding colors so that the film negatives are more easily interpreted.

Any one of the masks or the color filters on the tape 166 is properly positioned below the window 156, by rotating the knobs 162 to thread the tape, from one reel 164 to the other. In this fashion, the masks and the color filters are integrally formed with the film reader 10, so that accessory masks and color filters are not required. The tape 166 also is less subject to damage or loss, since it is contained within the structure 152, and is readily available for use.

The cold cathode tube 180, when energized in the manner described below, has the capability of providing light emission exceeding 500 foot-candles so that the light provided is more than adequate for reading photographic film negatives or positives, X-ray plates, photo-etch negatives for etching plastic sheets, all types of slides and the like. Furthermore, as in the case of the electro-luminescent panel 68 described above, the temperature of the cold cathode tube 180 rarely exceeds an ambient temperature of +10° F. so that it does not generate heat in contrast to those film readers using incandescent light bulbs and fluorescent tubes in combination with translucent light diffusing screens. The film therefore can be left on the cold cathode light source for viewing for a substantially longer period of time, without distorting or damaging it. The intensity of the cold cathode light source also remains substantially constant, so that individuals can use it to read film for relatively longer periods of time in comparison to existing film readers, without eye strain.

The film reader 10 preferably includes an appropriate AC-DC convertor for converting a 12 volt vehicle battery or a 28 volt aircraft battery to 110 volts AC to energize the electro-luminescent panel 68, so that the film reader can be used aboard vehicles such as trucks and airplanes. Since it is also compact in size and lightweight, this is of no major problem. The film reader 10 further includes a power supply for the cold cathode tube 180 which includes a reactance transformer 199 for converting a 110 volt to an initial output of approximately 5000 volts to energize the cold cathode tube. Once energized, the voltage requirement drops approximately 60 percent. The transformer 199 is coupled to the AC-DC converter or to an available 110 volt source of power, by means of a conductor 200.

The carrying case 12 is preferably fabricated of a lightweight, sturdy material such as fiber glass. The spacers 26, the film reel supports 80 and the crank arms 98 all can be fabricated of a strong plastic such as polycarbonate or of a metal such as aluminum for strength, lightness and durability.

It will thus be seen that the objects set forth above, among those made apparent from the preceding description, are efficiently attained and, since certain changes may be made in the above construction without departing from the scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention, which, as a matter of language, might be said to fall therebetween.

Now that the invention has been described, what is claimed is:

1. A portable light table comprising, in combination: a pair of complementary shells which are adapted to form a carrying case closable about the components of said light table, said components comprising a flat viewing surface which is illuminated affixed to a first one of said pair of shells, the second one of said pair of shells being positionable beneath said first shell to support said first shell and said flat viewing surface a spaced distance above a supporting surface, a pair of film reel carrier means adapted to be affixed to each of the opposite ends of said pair of shells for releasably fixedly locking said two shells together and for supporting reels of photograph film and for conveying said film over said flat viewing surface from one reel to the other, whereby said photographic film is illuminated for the reading thereof.

2. A portable light table, as claimed in claim 1, wherein each pair of said film reel carrier means is fixedly and positionably adjustably affixed to said shells to permit them to be adjustably spaced apart to support film reels of different widths, and further being detachable and storable in one of said pair of shells.

3. A portable light table, as claimed in claim 2, further including a support leg pivotally fixedly secured to said second one of said pair of shells at each of its opposite ends for supporting said light table, said support legs being pivotally movable into said second one of said pair of shells for storage.

4. A portable light table, as claimed in claim 1, wherein said film reel carrier means each comprises a substantially V-shaped member having a pair of arms which are adapted to be respectively affixed to the edges of said shells, means affixed to one of said arms of each of said V-shaped members for lockingly and adjustably affixing said V-shaped members to said shells, film reel support means affixed to each of said V-shaped members for rotatably supporting a film reel between pairs of them, and at least one crank arm for rotating said film reels.

5. A portable light table, as claimed in claim 4, wherein said flat viewing surface comprises an electro-luminescent panel which is adapted to be energized to illuminate said photographic film for reading it.

6. A portable light table, as claimed in claim 4, wherein said flat viewing surface comprises a closed box-like case having a window in a top wall thereof, at least a pair of support blocks affixed to the bottom wall of said case, a convoluted cold cathode tube affixed to and supported by said support blocks, and means for energizing said cold cathode tube.

7. A portable light table, as claimed in claim 5, further including a pair of film reels rotatably supported within said case and adapted to be rotated externally thereof; a tape wound on one of said film reels and threaded in a horizontally disposed position above said cold cathode tube and beneath said window and wound on the other one of said film reels, said tape functioning as a mask to block out a predetermined selectable area of said window to prevent light from passing through it.

References Cited

UNITED STATES PATENTS

| | | | |
|---|---|---|---|
| 1,680,633 | 8/1928 | Peters | 40—130 |
| 2,716,298 | 8/1955 | Spielmann et al. | 40—130 |
| 2,800,733 | 7/1957 | Chevillon | 40—106.1 X |
| 2,962,825 | 12/1960 | Bravo et al. | 40—106.1 |
| 3,026,410 | 3/1962 | Azan | 240—11.4 |
| 3,300,885 | 1/1967 | Haire | 40—130 |
| 3,314,178 | 4/1967 | Sayler et al. | 40—130 |
| 3,367,050 | 2/1968 | Doyle | 40—86 |

LAWRENCE CHARLES, Primary Examiner

U.S. Cl. X.R.

40—106.1; 240—11.4